(No Model.) 4 Sheets—Sheet 1.

A. NELSON.
STEAM ENGINE.

No. 355,335. Patented Jan. 4, 1887.

Witnesses.
P. A. H. Behel
A. O. Behel

Inventor.
Alfred Nelson
Per Jacob Behel,
Atty.

(No Model.) 4 Sheets—Sheet 2.
A. NELSON.
STEAM ENGINE.
No. 355,335. Patented Jan. 4, 1887.
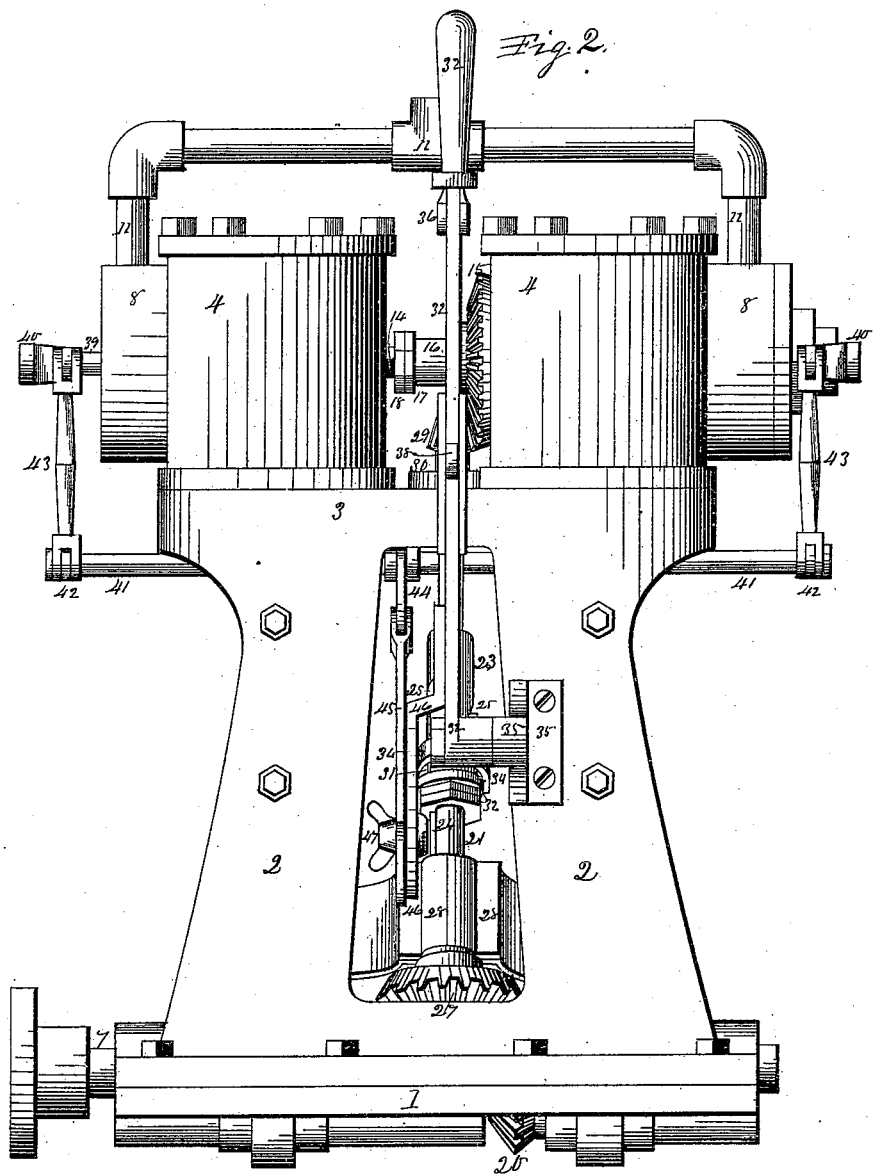

(No Model.) 4 Sheets—Sheet 3.
A. NELSON.
STEAM ENGINE.
No. 355,335. Patented Jan. 4, 1887.
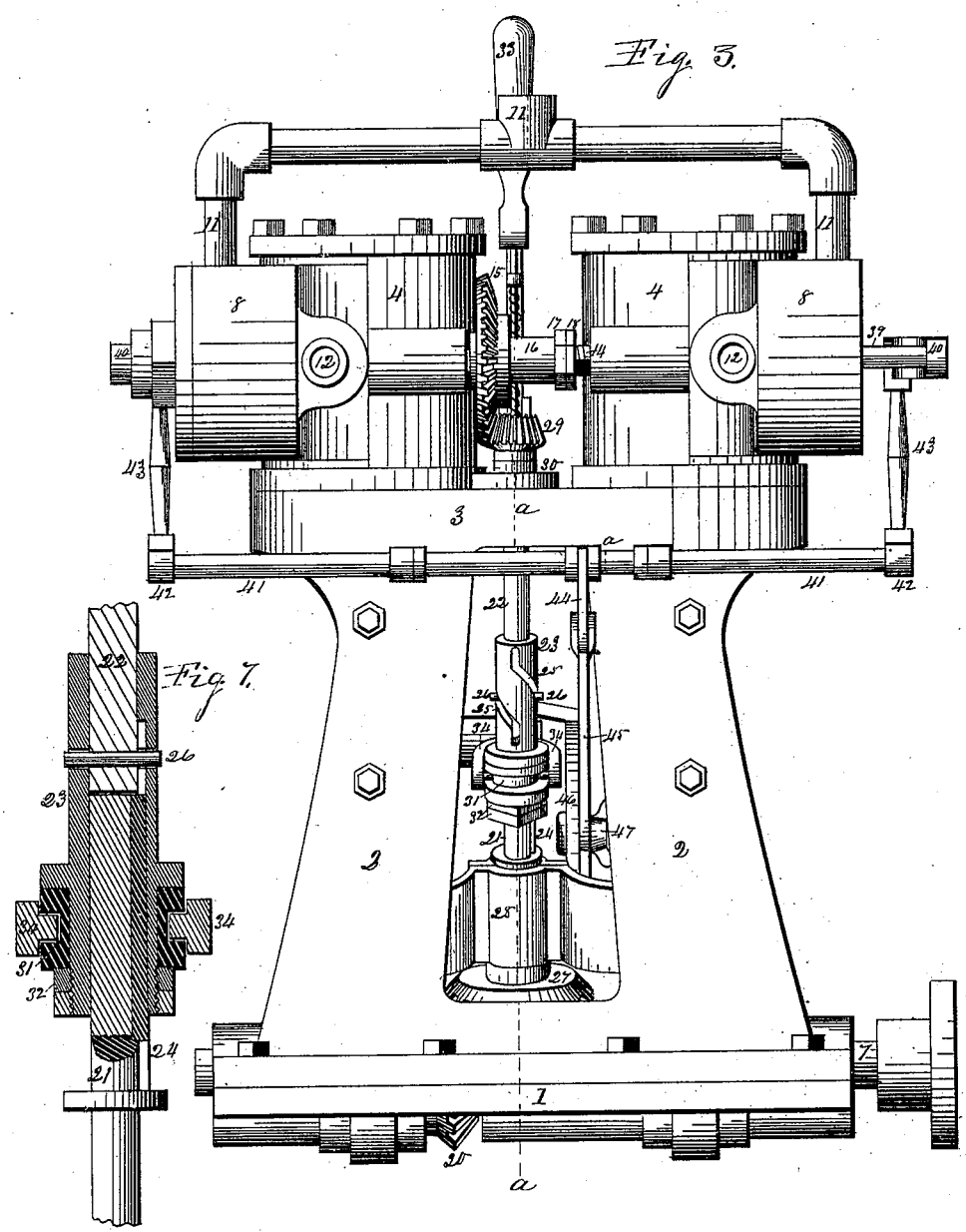

(No Model.) 4 Sheets—Sheet 4.
A. NELSON.
STEAM ENGINE.
No. 355,335. Patented Jan. 4, 1887.
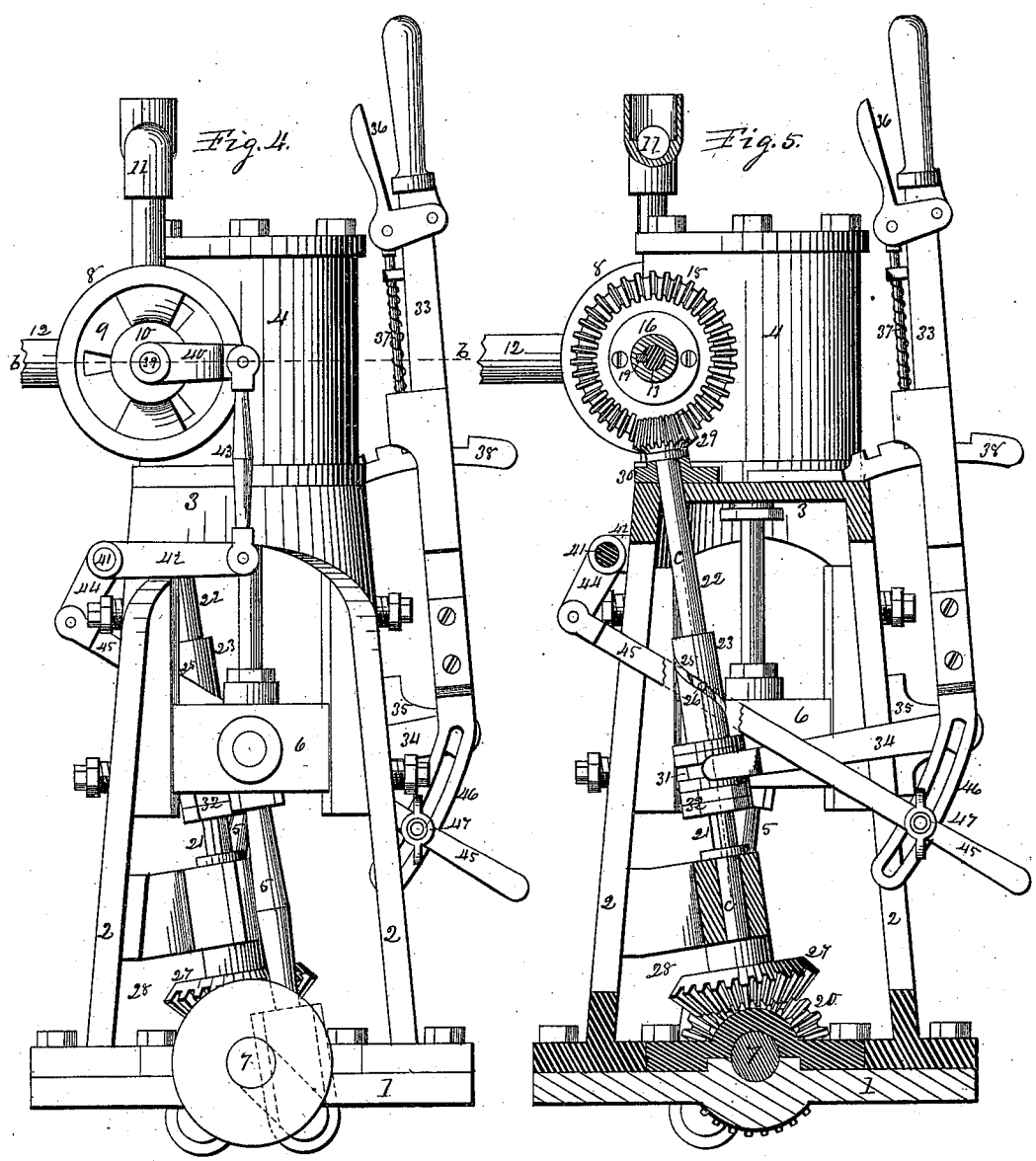
Witnesses:
P. A. D. Behel
A. O. Behel
Inventor
Alfred Nelson
Per Jacob Behel
Atty.

UNITED STATES PATENT OFFICE.

ALFRED NELSON, OF ROCKFORD, ILLINOIS.

STEAM-ENGINE.

SPECIFICATION forming part of Letters Patent No. 355,335, dated January 4, 1887.

Application filed March 2, 1886. Serial No. 193,785. (No model.)

*To all whom it may concern:*

Be it known that I, ALFRED NELSON, a citizen of the United States, residing in the city of Rockford, in the county of Winnebago and State of Illinois, have invented a new and useful Improvement in Steam-Engines, of which the following is a specification.

This invention relates to a class of engines known as the "double-cylinder engine." Its object is to provide a reliable reversing mechanism, an adjustable cut-off for simultaneously adjusting two valves, and obviate seat-friction of the valves, all of which, including the mechanism employed, illustrated in the accompanying drawings, will be hereinafter more fully described.

Figure 1:
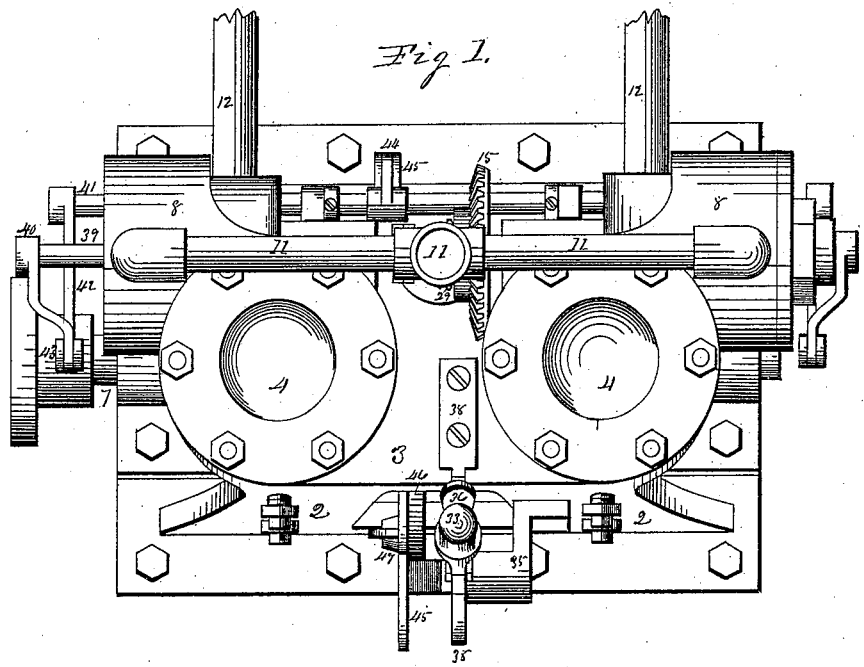
Figure 6:
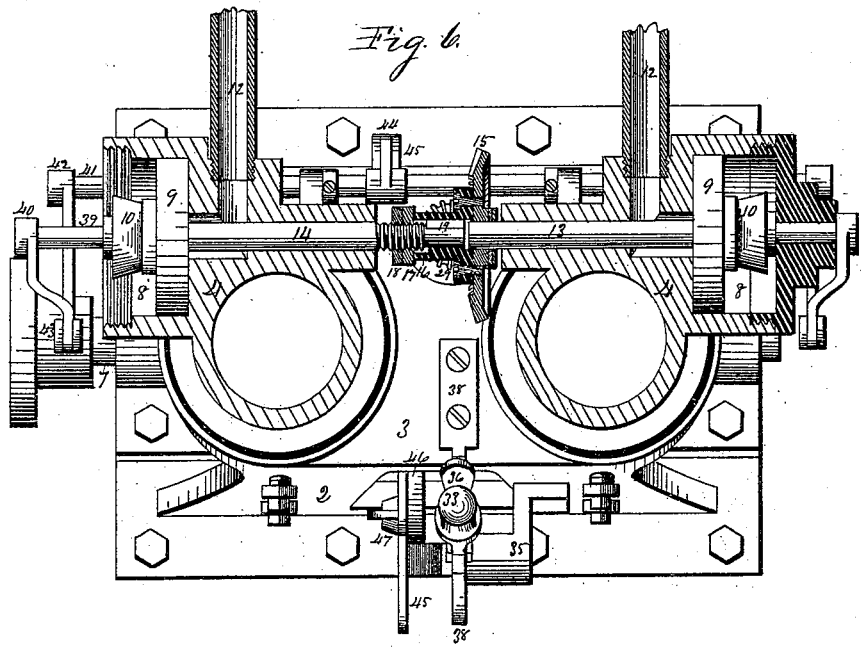

Figure 1 is a plan view of an engine embodying my invention. Fig. 2 is a front elevation. Fig. 3 is a rear elevation. Fig. 4 is an end elevation. Fig. 5 is a transverse central vertical section on dotted line *a* on Fig. 3. Fig. 6 is a horizontal section on dotted line *b* on Fig. 4. Fig. 7 is a vertical sectional detail on dotted line *c* on Fig. 5.

In the several figures, 1, 2, 3, 4, and 6, the head end of one of the steam-chests is omitted, to more clearly show the construction.

In the figures, the several parts, consisting of the frame composed of the base 1, the vertical supports 2, bed-plate 3, steam-cylinders 4, including their pistons, pitmen 5, crossheads 6, crank-shaft 7, steam-chests 8, and ports connecting the steam-chests with the cylinders, valves 9, cut-offs 10, steam-induction pipe 11, and exhaust 12, are substantially such as heretofore in use, and some of which were secured to me in Patent No. 332,101, dated December 8, 1885.

The valve-shaft is composed of two sections, 13 and 14, supported to revolve in bearings on the same axial line, and the outer ends of the respective sections extend through the central exhaust into the steam-chest and receive the valves, with which they have a feather-clutch connection, to carry the valves with the rotation of the shaft. A gear-wheel, 15, is fixed on the inner end of the right-hand section, 13, of the shaft. A sleeve-formed coupling, 16, is fixed to the inner face of the gear-wheel 15. The inner end portion of the lefthand section, 14, of the shaft is screw-threaded, and is provided with an adjusting screw-nut, 17, to engage the end of the coupling to vary the length of the shaft by separating its two sections or permitting them to approach each other to adjust the valves to their seats to reduce their friction to its lowest practical point, and a jam-nut, 18, is employed to fix the adjusting-nut 17. The extreme end portion of the left-hand section, 14, of the shaft is connected with the coupling 16 by means of a feather, 19, to cause them to revolve in unison and permit of endwise adjustment. A gear-wheel, 20, is mounted on the central portion of the crank-shaft 7.

A vertical shaft consisting of two sections, a lower section, 21, and an upper section, 22, is supported in its central connection in a sleeve, 23, capable of an endwise sliding movement on the shaft. The lower section, 21, of the shaft is provided with a feather, 24, to enter a groove formed in the lower portion of the sleeve, to cause it to revolve with the shaft and permit it to move endwise thereon.

The upper portion of the sleeve is provided on opposite sides with a spiral groove, 25, which receives the projecting ends of a pin, 26, passed through the upper section of the shaft, and in the endwise movements of the sleeve, in connection with the spiral grooves, will impart an oscillatory movement to the upper section of the shaft in one or the other direction as the sleeve is moved up or down on the shaft.

A gear-wheel, 27, is mounted on the lower end of the lower section of the vertical shaft, which is supported to revolve in a bracket-bearing, 28, projecting from the vertical supports of the frame in position to place the teeth of the wheel in working-contact with the teeth of the gear-wheel 20 on the crank-shaft.

A gear pinion, 29, is mounted on the upper end of the upper section of the vertical shaft, which is supported to revolve in a bearing, 30, fixed to the supporting-frame in position to place the teeth of the pinion in working-contact with the gear-wheel 15 on the valve-shaft.

The arrangement of the gear-train connecting the crank-shaft with the valve-shaft, in connection with the valves, the steam induction and exhaust ports, is such that the extreme endwise movements of the sleeve will so change the valve-ports, relatively with the induction and exhaust ports of the cylinders, as to reverse the action of the pistons, and consequently the direction of the rotations of the crank-shaft.

In the center of the endwise movement of the sleeve, as shown in Fig. 3, the valves will be carried to the center of their oscillatory movements, at which point the valve-ports will be in such position relatively with the induction-ports to the cylinder as to exclude the steam, and consequently stop the engine. The sleeve is provided with an annular grooved collar, 31, in this instance held in place by screw-nuts 32.

A reversing-lever of bell-crank form, consisting of the vertical handle-arm 33 and a horizontal arm, 34, has its fulcrum-support at its angular point on a stud-journal projecting from a bracket, 35, projecting from the supporting-frame. The free end of the horizontal arm of the reversing-lever is produced in yoke form to embrace the annular grooved collar, and the arms thereof are provided with inward-projecting stud-pins which enter the annular groove in the collar. A thumb-lever, 36, is pivoted to the handle end of the reversing-lever, and connects with a spring-actuated bolt-detent, 37, employed to engage a segment ratchet-bar, 38, projecting from the supporting-frame.

The segment ratchet-bar is provided on its edge with three notches to receive the spring-actuated bolt-detent to hold the lever in its adjusted position on the segment ratchet-bar. The notches formed in the segment ratchet-bar relatively with the movements of the lever are such that the center notch holds the valves in position to close the ports against the admission of steam, and the notches on each side of the center to receive the spring-actuated detent hold the valves in position to admit steam to cause the crank-shaft to revolve in one or the other direction, as the lever is adjusted in one or the other direction to cause the detent to engage the notch on one or the other side of the center notch in the segment ratchet-bar.

A shaft, 39, in each steam-chest has a feather-clutch connection with the cut-off 10, and extends outward through the axial center of the chest-head. The projecting ends of the cut-off shafts 39 are each provided with a crank-arm, 40, fixed thereto.

A rock-shaft, 41, is supported to oscillate in bearings projecting from the supporting-frame. To the ends of the rock-shaft 41 are fixed crank-arms 42, and a connecting-rod, 43, is pivotally connected with the free ends of their respective crank-arms 40 and 42 at each end of the machine in such a manner that an oscillatory movement of the rock-shaft 41 will cause the cut-off in their respective steam chests to oscillate in unison. The central portion of the rock-shaft is provided with a crank-arm, 44, to the free end of which is pivoted a connecting-bar, 45, which extends through the supporting-frame and is pivotally connected in the depending slotted segment-arm 46 of the reversing-lever 33.

The slot in the segment-arm 46 is concentric with the pivotal connection of the connecting-bar 45 with the crank-arm 44 on the rock-shaft when the cut-off lever is in its central vertical position, as shown in Figs. 4 and 5, to permit the adjustment of the connecting-bar in its slotted segment-support without changing the position of the cut-offs relatively with the induction-ports.

In this construction and arrangement of the cut-off mechanism with the reversing-lever the adjustment of the cut-offs relatively with the induction-ports of the valves and cylinders are such that when the connecting-bar 45, in its connection with the slotted segment, is moved upward and adjusted on the pivotal center of the reversing-lever the steam will be excluded from the cylinder and the adjustments of the reversing-lever will not in any manner operate to change the position of the cut-offs, and the engine will be still.

If the connecting-bar 45 is adjusted to the extreme outer or lower end of the slotted segment, the adjustment of the reversing-lever to either side of its central position will place the cut-off in position to admit steam to the cylinder throughout the length of the piston-stroke, or the piston will be working under full-stroke steam-pressure. If the connecting-bar 45 is adjusted centrally between the extremes of the segment, the steam will be cut off at half-stroke of the piston; and if at the first quarter from the extreme outer end of the slotted segment, the admission of steam will be cut off at three-fourths piston-stroke; and if at three-fourths from its extreme outer end, steam will be cut off at one-fourth piston-stroke. By this arrangement the cut-offs may be adjusted to cut off the flow of steam at any point of the piston-stroke, and the adjustment may be made when the engine is running and the cut-off regulated to adjust the engine to the duty required.

When the connecting-bar is adjusted to the required position on the slotted segment, it can be fixed by means of a clamping thumb-screw nut, 47.

I claim as my invention—

1. The combination, with the valves, of a two-part valve-shaft connecting the same and devices for adjusting said shaft lengthwise between said valves, substantially as and for the purpose set forth.

2. The combination, with the valves and their seats, of a two-part valve-shaft connecting said valves, said shaft having a sleeve-coupling and screw-adjustment for varying the length of the shaft to adjust the valves relatively to their seats, substantially as set forth.

3. The combination, with the valve-shaft and with the crank-shaft, of a gear-train connection of said shafts, the intermediate gear-wheels of the train capable of an independent oscillatory adjustment relatively with each other, substantially as and for the purpose set forth.

4. The combination, with the valves, of the two-part shaft connecting the same and carrying the intermediate gear-wheels of the train connecting the valve-shaft with the crank-shaft of a sleeve connection of the sections of the shaft, substantially as and for the purpose set forth.

5. The combination, with the valves, of the two-part shaft connecting the same, a sleeve connecting the two sections of the shaft, said sleeve having a feather-connection with one section of the shaft and a spiral groove and pin connection with the other section to impart an oscillatory movement to the shaft in the endwise movement of the sleeve, as and for the purpose set forth.

6. The combination, with valves of the sleeve-connection, of the two-part shaft operating said valve, a reversing-lever to operate the sleeve, and devices for locking said lever to hold the parts in their adjusted position, substantially as and for the purpose set forth.

7. The combination of the cut-offs, their shaft and crank-arm connections, a rock-shaft and its end crank-arms, and rods connecting the free ends of the crank-arms on their respective sides of the machine to adjust the cut-offs in unison, for the purpose set forth.

8. The combination, with the valves, a rock-shaft connected therewith, the reversing-lever, of a rod connecting the reversing-levers with the rock-shaft, substantially as and for the purpose set forth.

9. The combination, with the rock-shaft and with the slotted segment-arm of the reversing-lever, of a rod connecting the rock-shaft with the slotted segment, said rod having a crank-arm connection with the rock-shaft and made adjustable in its connection with the slotted segment, substantially as and for the purpose set forth.

10. The combination, with the valves, of the cut-offs, the reversing-lever and intermediate mechanism, substantially as shown and described, connecting the lever with the cut-offs, as and for the purpose set forth.

11. The combination of the valves, the independent cut-offs, and an operating-lever and intermediate mechanism, substantially as shown and described, connecting the valves and the cut-offs with the operating-lever, substantially as and for the purpose set forth.

ALFRED NELSON.

Witnesses:
JACOB BEHEL,
A. O. BEHEL.